United States Patent [19]

Fujiwara

[11] Patent Number: 4,784,200
[45] Date of Patent: Nov. 15, 1988

[54] HIGH PERFORMANCE TIRE TREAD
[75] Inventor: Kenichi Fujiwara, Miki, Japan
[73] Assignee: Sumitomo Rubber Industries, Ltd., Japan
[21] Appl. No.: 844,379
[22] Filed: Mar. 26, 1986
[51] Int. Cl.⁴ .............................................. B60C 11/03
[52] U.S. Cl. ................................................ 152/209 R
[58] Field of Search ...................... 152/209 R, 209 D; D12/136, 140

[56]     References Cited
U.S. PATENT DOCUMENTS

| 4,086,948 | 10/1985 | Suzuki | 152/209 R |
| 4,461,334 | 7/1984 | Tansei et al. | 152/209 R |
| 4,545,415 | 10/1985 | Lindner et al. | 152/209 R |
| 4,546,808 | 10/1985 | Fontaine et al. | 152/209 R |

FOREIGN PATENT DOCUMENTS 0061008  4/1983  Japan ............... 152/209 D

Primary Examiner—Michael W. Ball
Assistant Examiner—Geoffrey L. Knable
Attorney, Agent, or Firm—Stevens, Davis, Miller & Mosher

[57]  ABSTRACT

A pneumatic tire characterized in that: a tread is divided into a tread crown portion having a width corresponding to about 30% to 65% of the tread width, and two tread shoulder parts by at least two main longitudinal grooves extending in substantially zigzag or wavy line; the tread crown portion is provided with one or more central ribs or central blocks row; both tread shoulder parts are provided with one or more outer ribs or outer block rows; and the rib or blocks on the both shoulder parts are provided with a plurality of narrow cut grooves so that the circumferential stiffness index of the pattern and a volume index of the narrow cut grooves may be set at 30 to 70 and 2.5 to 15, respectively.

5 Claims, 7 Drawing Sheets

Present Invention-1

FIG.1 Present Invention-1

HIGH PERFORMANCE TIRE TREAD

BACKGROUND OF THE INVENTION

This invention relates to a pneumatic radial ply tire and, in particular, a radial tire suitable for use for trucks, buses, light trucks, and other vehicles, and is mainly intended for improvement of the high speed durability of such tires without sacrificing wear life, and at the same time, fot improvement in maneuverability and the ride feeling.

Accordingly, it is an object of the present invention to provide an excellent tread pattern with high speed durability and wear life.

The high speed durability of tire is mainly affected by the structure, the profile and the material used for the tire. First of all, in the structure, a bias tire comprises a carcass composed of a plurality of rubberized ply layers each containing fiber cords embedded therein, each cord of which is crossed with each other at an angle of 40° to 25° with respect to the equatorial line of the tire, for example, the carcass of bias ply tires for a truck and bus tire is composed of several ply layers of virtually unwoven fabric, each ply of which is superimposed with one another. On the other hand, a radial ply tire comprises a carcass of a substantially radial construction composed of one ply layer containing steel cords embedded therein and turned up around a pair of bead core and a belt layer composed of 3 to 4 ply layers each containing steel cords embedded therein, said cords being crossed with one another at an angle of 15° to 70° with respect to the equatorial line of the tire and superimposed about said carcass ply beneath a tread to exhibit a strong belt effect.

As the result of such construction, a radial ply tire has a tread with high stiffness and less movement of tread rubber, which leads to a high resistance to wear of rubber, by the same reason as mentioned above, heat generation resistance and rolling resistance are excellent too.

On the contrary, in the case of bias construction tires, as mentioned above, the carcass composed of several ply layers superimposed with one another and a belt layer composed of several ply layers, each ply of which is crossed with one another and disposed between the said carcass and the tread rubber.

As a result, the carcass of bias tires is made to be thicker than that of radial tires and the movement of tread rubber, while a tire is in contact with ground, is larger than that of radial ply tires, because of the carcass ply construction of the textile cords having low stiffness as compared with steel cords.

Further, the carcass and the belt layer are to deform in company with the variation of the cord angle under load, which is the so-called pantographic movement, which leads to a likely to increase the heat generation and to lower the resistance to wear because of large movement of rubber and to increase the rolling resistance. These characteristics are summarizes in Table 1.

From Table 1, it can be fully understood that a radial construction is one which can display its ability under high speed traveling on a good paved road. Next, concerning the profile of a tire, which is generally expressed by the so called aspect ratio, that is, the ratio of the section height to the section width.

TABLE 1

Comparison of performances between bais and radial oily tire

| Usage | Performance (Index) | Bias tire | Radial tire |
|---|---|---|---|
| tires for truck and bus 10.00-20 10.00 R 20 | Tread Wear Resistance | 100 | 150–200 |
| | Rolling Resistance (70 km/h) | 100 | 68–72 |
| | Fuel consumption | 100 | 88–92 |
| | Heat generation at shoulder under high speed traveling | 100 | 40–50 |

Figure 10A:
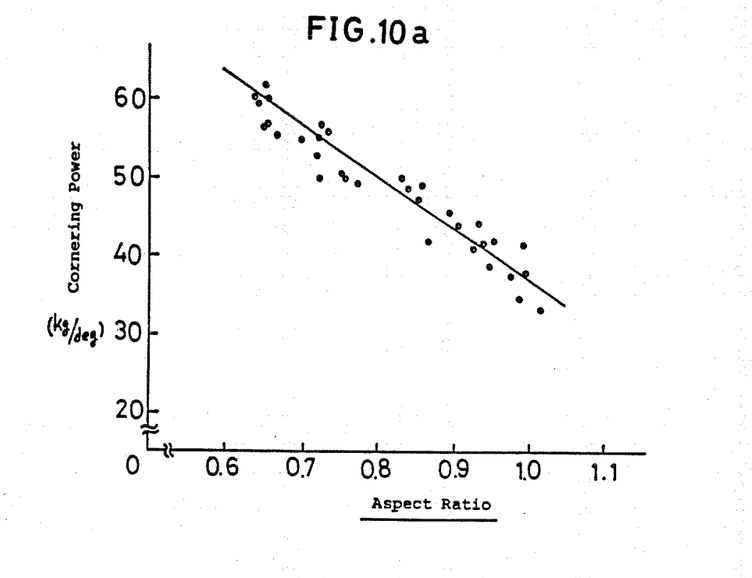
FIG. 10(a) is a graph showing the relation between cornering power and the aspect ratio of a tire.
Figure 10B:
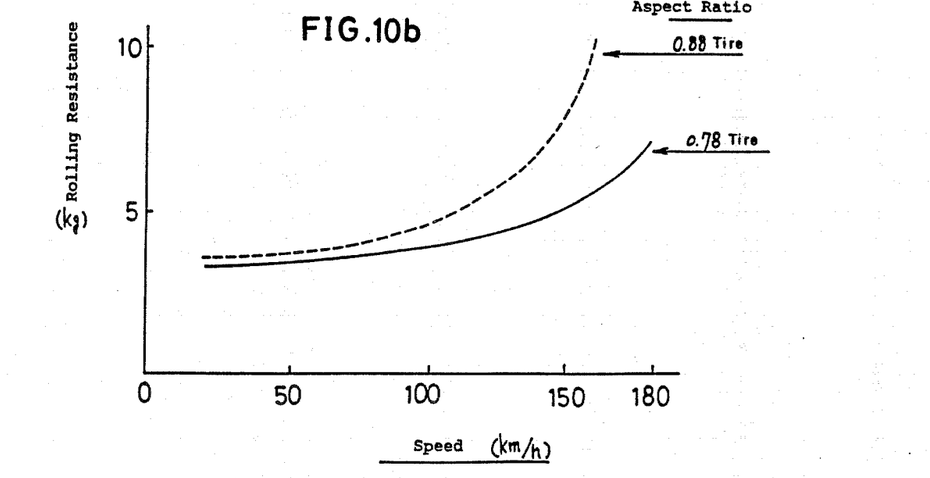
FIG. 10(b) is a graph showing the relation between rolling resistance and the aspect ratio.

The merits of low profile tires are such that the cornering power is increased according to the icrease of the lateral stiffness with the expansion overall of the tire width due to adoption of low profile (FIG. 10a). Accordingly, the maneuverability of vehicles is improved together with decreasing of the energy loss brought about by decreasing of the radial deflection of such tires, which lead to the decrease of heat generation and rolling resistance. Accordingly, the durability for high speed running and the fuel consumption are improved (FIG. 10b).

Next, taking into consideration the high speed durability from the stand point of material used for tire construction, the factors, which mainly affect the tire performance, are the tread rubber compound and cord material of tires, concerning the rubber compound for the thread, there should be a limit for material which is suitable for the tread so as to be well-balanced with each performances of not only heat generation but also the resistance to wear and cut, as well known, polybutadiene rubber (BR) and natural rubber are superior to SBR in heat generation resistant and the larger the particles of carbon black as filler for reinforcement, the lower the heat generation, and it is known that when the volume of carbon block filled in the rubber compound increases, the heat generation increases. As to the heat resistance of cord materials for the carcass, it is known that steel cords show the best performance in a grouping of steel, polyester, nylon and rayon.

As understood by summary the above described, the research work for the betterment of high-speed durability of tires has been much improved; one notices the big ranges of switch over of tire construction, from bias to radial, from normal tire to low-profile one, from Rayon to Nylon, from Nylon to Polyester, and from polyester to steel where one finds the big advancement of the high-speed durability in accordance with these changes accordingly.

However, lately, with the remarkable improvement of road situations such as the development of expressway networks and the like, the chance to drive at high speed has increased, and the demand for tires having long life has become conspicuous for economic reason. However, according to the prior art of tire design, the high speed performance has been increased with sacrificing of wear life, on the contrary, the wear life has been increased with sacrificing of high speed performance, actually there has been only such antinomic design technique of tire hitherto.

For example, in order to increase the durability at high speed, the thickness of tread should be designed to be thin as as possible because of the need to decrease heat generation. Accordingly, the wear life of such tires become short as an inevitable consequence.

However, the user of tires cannot be satisfied with such unbalanced tire performance for any length of time, the requirement for a well balanced tire, which has a long life and an improved high speed durabilty, has become conspicuous of late.

That is, it is required to increase the durability of such tires as the depth of the longitudinal main grooves is deeper than conventional ones and the thickness of tread is greater.

DETAILED DESCRIPTION

As above described, it could not be made by the prior art to get so well balanced improvement as to simultaneously increase the durability of high-speed and the resistance to wear (long life), However, the inventors of the present invention made various investigations about tread patterns which can decrease the heat generation of such a tire as being superior in the resistance to wear, as the result, they found out the below means to solve the problem above described, that is, in a pneumatic tire comprising the rubber surface of said tread divided by at least two longitudinal main grooves extending in the circumferential direction of a tire in the pattern of a zigzag or wavy line into a tread crown part having a width corresponding to about 30 to 65% of the tread width and centering at the equatorial plane of the tire and into the tread shoulder parts lying on either side of said tread crown part; one or more central ribs or rows of central blocks comprising blocks in various shapes are provided on said crown part, whereas outer ribs or outer rows of blocks on both shoulder parts, a plurality of narrow cut grooves extending in the axial direction of the tire are provided for ribs or blocks on both said shoulder parts so that a circumferential stiffness index of the pattern and a volume index of the cut groove may be set at 30 to 70 and 2.5 to 15, respectively.

Generally, it is know that the temperature generated, while a tire is in rotation, is highest at both shoulder parts of the tire except special cases. The inventor of this invention, as to temperature rise at both shoulder parts, selected seven items such as a ratio between surface areas of cut grooves at the shoulder parts, shape index (cross-sectional area of loaded tire/free surface area), pattern transverse stiffness, pattern circumferential stiffness, volume of cut groove, shoulder gauge, and tread radius as factors of temperature rise and examined the correlation between temperature and the above factors depending on multiple regression analysis. It has been found that "volume of cut groove" and "pattern circumferential stiffness" greatly contribute to temperature rise.

Figure 5:
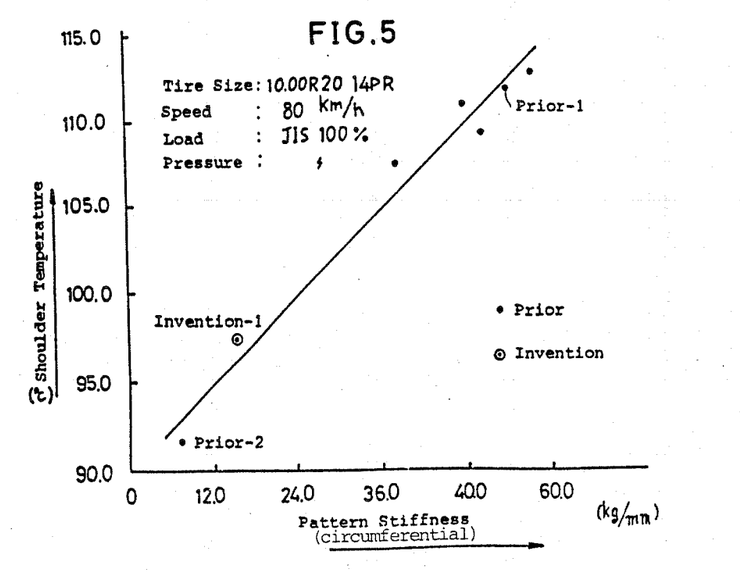
FIG. 5 is a graph showing the relation between pattern circumferential stiffness and temperature at the shoulder part.
Figure 6:
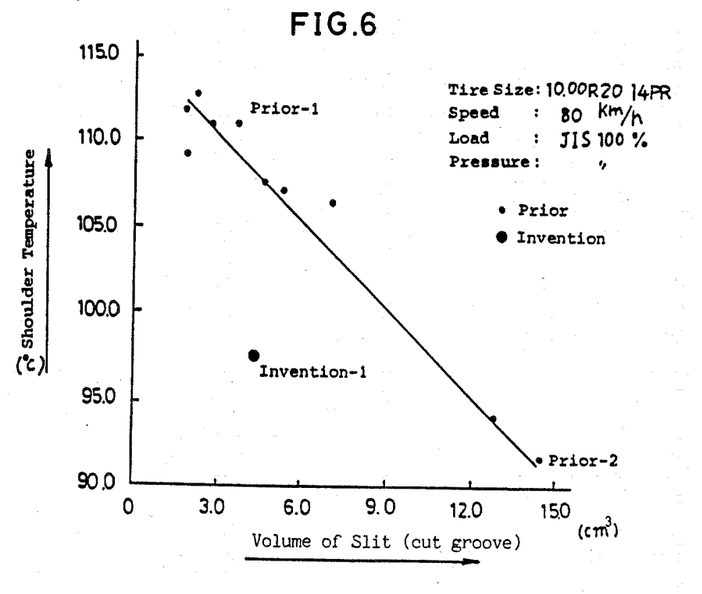
FIG. 6 is a graph showing the relation between the volume of cut grooves and the temperature.
Figure 7:
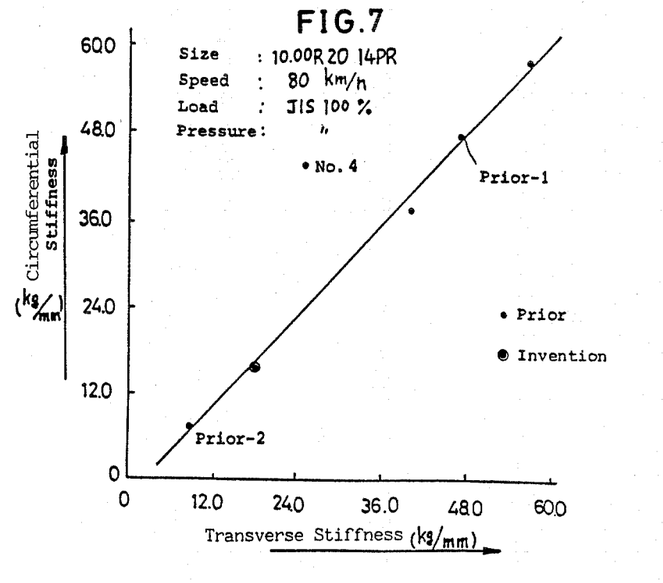
FIG. 7 is a graph showing the relation between transverse stiffness and circumferential stiffness.
Figure 8:
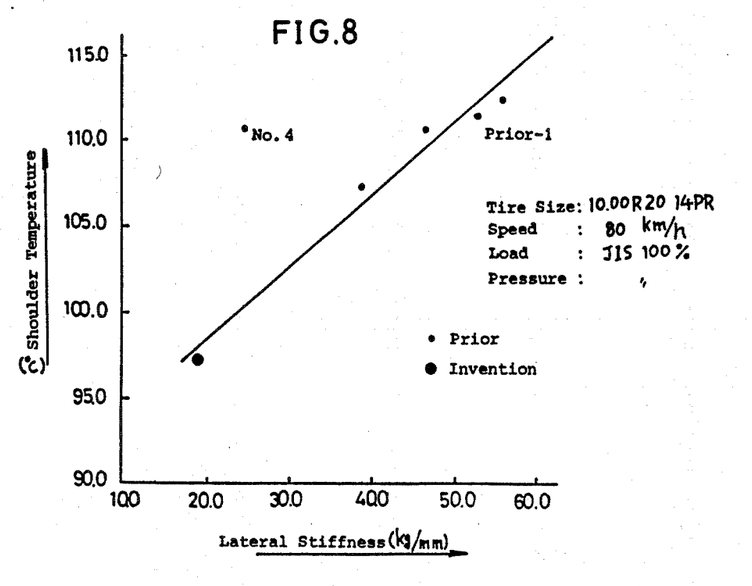
FIG. 8 is a graph showing the relation between transverse stiffness and temperature at the shoulder parts.

FIG. 5 graphically shows a relation between pattern circumferential stiffness at the shoulder part and temperature, wherein the lower the circumferential stiffness, the lower the temperature at the shoulder part. FIG. 6 shows a relation between the volume of cut groove and temperature, wherein the larger the volume of cut groove, the lower the temperature, but as regards an embodiment of this invention, it can be fully understood that, even when the volume of cut groove is equal to that of the conventional tire, the temperature is nearly 20° C. lower than that in a conventional tire. A comparison of transverse stiffness with the circumferential one of a pattern indicates that, as shown in FIG. 8, a temperature in the pattern No. 4 having transverse stiffness lower than circumferential stiffness as shown in FIG. 7 is 111° C., degrees which is not low at all.

Incidentally, circumferential stiffness per pitch in the pattern No. 4 was 44.0 whereas transverse stiffness 25.2, From the above fact, it has been found that lowering of temperature must depend on a reduction of circumferential stiffness rather than transverse one.

Figure 4:
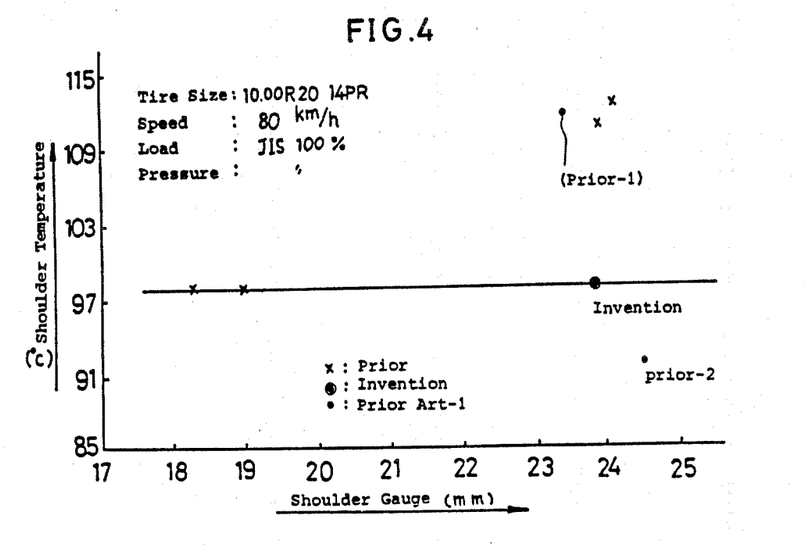
FIG. 4 is a graph showing the relation of rubber gauge with heat generation at the shoulder part with respect to the pattern of example 1 (FIG. 1) according to the present invention, that of control Example (shown in FIG. 2 and FIG. 3), and that of the conventional tire.

FIG. 4 graphically shows that a relation between the tread gauge at the shoulder parts and temperature in the tire, wherein the temperature rises with the increase in tread gauge in conventional tire but, in the embodiment of this invention (FIG. 1), despite the shoulder gauge of 23.8 mm, the temperature of the tire is as low as that of a conventional tire having a tread gauge of 18 to 19 mm.

Figure 1:
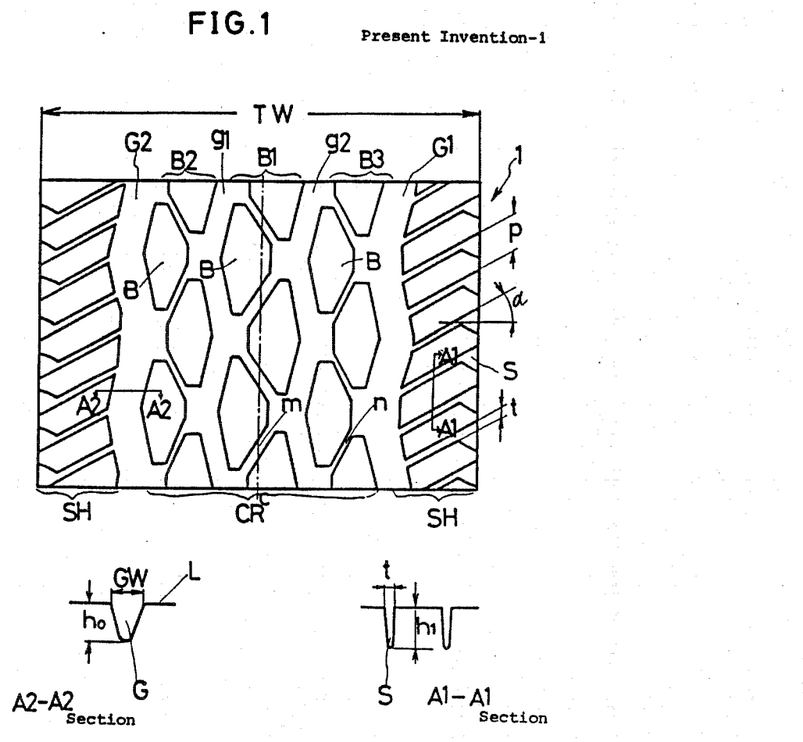
FIG. 1 is a developed plane view of a tread patterns having a series of cut grooves at its shoulder parts according to the present invention.
Figure 9:
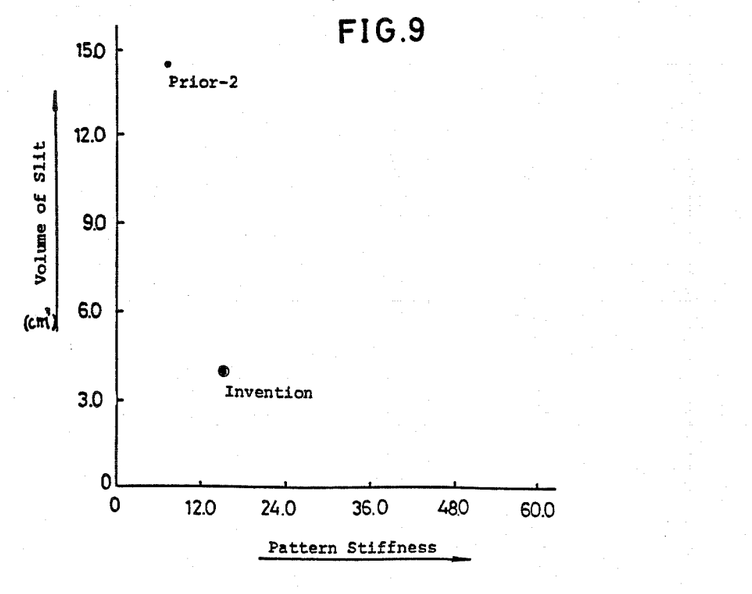
FIG. 9 is a graph showing the relation between pattern stiffness and volume of groove.

It is supposed that lowering of the stiffness of the pattern depending on pattern effect leads to a decrease in resistance of the tire to wear, however, in this respect, FIG. 9 shows that values of pattern stiffness of tires shown in FIG. 1 and FIG. (3a) are 15.6 and 7.7, respectively, that is, 1:0.5 in terms of ratio, and volumes of cut grooves are 4.16 cm$^3$ and 14.4 cm$^3$, respectively, that is, a 1:3.5 in ratio. In the pattern shown in FIG. 1, the volume of groove is small in proportion to pattern stiffness (FIG. 9) as compared with that shown in FIG. 3(a). That is to say, it has been found that, when reducing pattern stiffness, resistance to wear is reduced with the increase in volume of the cut groove and therefore, by a narrow setting of the width t of the cut at the shoulder part as in the pattern shown in FIG. 1, control over the temperature rise and prevention of a decrease in resistance to wear are ensured. An appropriate width t of a cut S is from 0.5 to 5 mm, more preferably from 1 to 3 mm. A volume index of the cut is preferably within the range from 2.5 to 15. An index exceeding 16 results in too large a volume of the cut which accelerates wear of rubber and, further, unfavorably generates noise or tends to pick up pebbles. On the other hand, too small an index, say not exceeding 2.4, degrades wet gripping and causes problems in safety of vehicles. An index of circumferential stiffness is preferable when ranging from 30 to 70 but, when it is low as not greater than 29, causes the rubber block to tend to chip off and, being 71 or higher, invites problem as to generation of high temperature. Provision of a plurality of cut grooves for adapting the circumferential stiffness index to range from 30 to 70 improves gripping performance of the tread and reduces wear of the tire occurring during slippage, thereby the so-called shoulder wear being markedly eliminated.

The definition "pattern stiffness" and "volume index" of the cut groove will be explained hereinafter.

(Pattern stiffness index)

Figure 11:
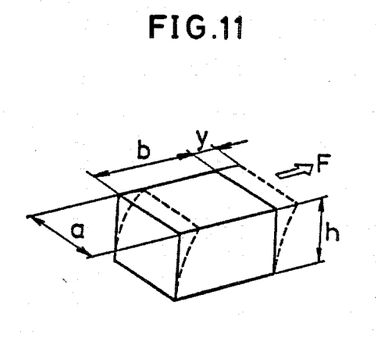
FIG. 11 is a view of block sample for describing the secondary mount of the stiffness index at the section of block.
Figure 12:
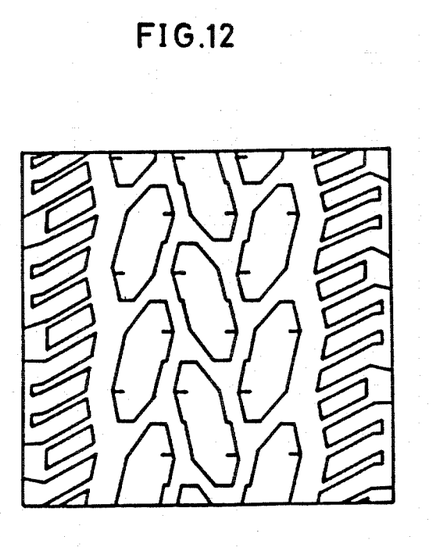
FIG. 12 is a developed plane view of another embodiment of tread pattern according to the present invention.

In said shoulder parts, pattern stiffness, which is pattern stiffness in contact length with ground under specified load and inner pressure, is defined by the below equations.

$$kp = \frac{F}{y} = 1 / \left( \frac{h^3}{3EI} + \frac{h}{AG} \right) \quad (1)$$

kp: pattern stiffness (kg/mm)
F: tangential force at ground contacting surface (kg)
y: variation of pattern (mm)
h: pattern depth (mm)
E: Elastic modulus at elongation of tread rubber (kg/mm$^2$)
G: Shearing modulus (=E/3) (kg/mm$^2$)
I: secondary moment at block section (mm$^4$)
  I=ab$^{3/12}$ in the block shown in FIG. 11
A: Sectional area of block (mm$^2$)

In the case of actual pattern, the pattern depth is different from the h1 of the cut groove in the shoulder parts, and several blocks are adopted, so it is treated follow, the pattern stiffness at tread surface, $$Kps = Kps1 + Kps2 + \ldots + Kpsn$$

to use h=h1 in equation (1) the pattern stiffness (Kp$\beta$) at the base tread part is to use h=ho−h1 (FIG. 1) in equation (1)

the total pattern stiffness KpT $$KpT = 1 / \left( \frac{1}{Kps} + \frac{1}{Kp\beta} \right)$$

the pattern stiffness Kpo in the case of no subgroove is to use h=ho in equation (1)

circumferential stiffness index of the pattern = $\frac{KpT}{Kpo} \times 100$ (Volume index of the cut groove)

the ratio of the volume of groove to total volume of shoulder part.

Volume index of the cut groove =

$$\frac{\text{volume of cut grooves in shoulder part}}{\text{surface area of shoulder part} \times \text{pattern depth}}$$

(Example)

An example according to the present invention on the basis of the above described findings will be explained with reference to the drawings.

The tread 1 comprises a crown part CR defined by two main longitudinal grooves having their deepest depth extending in the circumferential direction of a tire and centered at the equatorial plane C of the tire so as to extend in width corresponding to 30 to 65% of the tread width TW, and also shoulder parts extending outside both sides of the said crown part CR, in which circumferentially extending longitudinal narrow grooves g1 and g2 narrower than the said longitudinal main grooves G1 and G2 are arranged on the crown part, sub-groove m and n extend between longitudinal main grooves and between the main groove and the narrow groove to communicate with each other so as to form rows of blocks B1. B2 and B3 on the crown part, each row of block comprises approximately parallelogrammatic blocks B, on the shoulder blocks SH lying outside the longitudinal main grooves G1 and G2, a plurality of cut S are provided in the circumferential direction of the tire at equal pitches P of 15 mm and at inclination angle α of 30 degrees with respect to the equatorial plane of the tire, the width t and depth h1 of the cut S is 2 mm and 13 mm, respectively, the depth h0 of the longitudinal main grooves G1 and G2 is to be of extra heavy tread type.

For example, a depth ranging from 16.6 mm to 20.6 mm is adopted to a tire of 10.00 R 20 in size. In the present example, a depth is set at 18.00 mm. A width GW of the groove G of a U-shape in cross section A2—A2 is 14.5 mm. A longitudinal narrow groove g is 18 mm depth and 9.5 mm width; a sub-groove m is 5 mm width and 11 mm depth; and another sub-groove n is 2 mm width and 9 mm depth. In the example No. 1 shown in FIG. 1, a pattern stiffness index and cut groove volume index are 64 and 10.5, respectively.

On the other hand, control example 12 according to the prior art were made on trial. Specifications of test samples are listed in Table 4.

Above said test samples are 10.00R 20 14PR. in size and tire construction except treat pattern and component materials are of all same specification. The test results of there three kind of tires are as follow

TABLE 4

|  | Example 1 | Control example 2 | Control example 1 |
| --- | --- | --- | --- |
| Depth of cut at shoulder part (mm) | 13 | 18 | 5.5 |
| Width of cut at shoulder part (mm) | 2 | 10 | 11.5 |
| Ratio of cut surface area at shoulder part | 0.19 | 0.38 | 0.18 |
| Shape index at shoulder part | 0.44 | 0.34 | 0.72 |
| Pattern transverse stiffness at shoulder part (kg/mm) | 18.6 | 8.8 | 52.7 |
| Pattern circumferential stiffness at shoulder part (kg/mm) | 15.6 (64) | 7.7 (38) | 53.8 (94) |
| Volume of cut at shoulder part (cm$^3$) | 4.160 (10.5) | 14.400 (36.4) | 1.898 (4.8) |
| Thickness of rubber | 23.9 | 24.6 | 23.5 |

TABLE 4-continued

Figure 2:
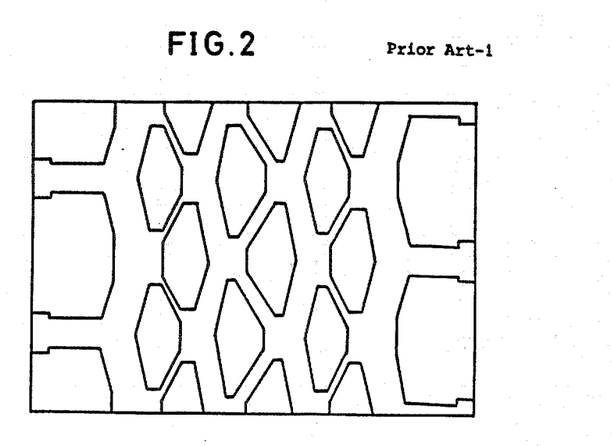
FIG. 2 is a developed plane view of a tread pattern having a series of lateral grooves at shoulder parts according to the prior art.
Figure 3A:
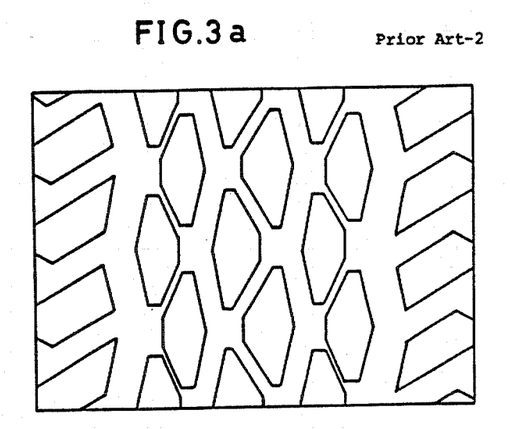
FIG. 3(a) is a developed plan view of a tread pattern showing the index of the present invention but with a different groove volume.
Figure 3B:
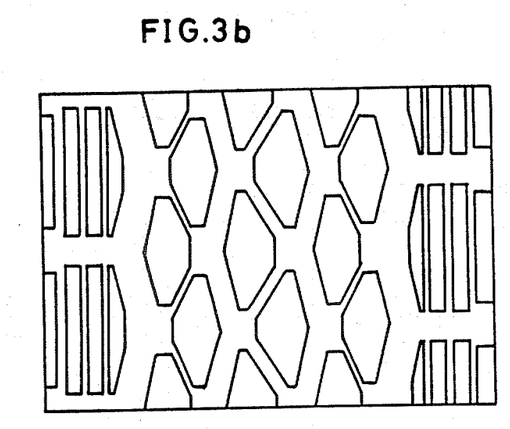
FIG. 3(b) is a developed plan view of a tire pattern described as No. 4 pattern in FIG. 7 and FIG. 8.

|  | Example 1 | Control example 2 | Control example 1 |
|---|---|---|---|
| at shoulder part (mm) |  |  |  |
| Tread radius of curvature at 100% air pressure (mm) | 585 | 585 | 585 |
| Tread pattern | FIG. 1 | FIG. 3(a) | FIG. 2 |

The numeral in parenthesis, ( ), indicates an index.

Component materials and construction except tread pattern types are common to all. the test results of these three kind of tires are as follow.

(High-speed durability)

The test of durability to high speed running about said sample tires was performed according to the following method, results thereof being shown in Table 5.

TABLE 5

|  | Braking speed: length of time of running |
|---|---|
| Example 1 | 130 km/h: 60 min. to fail |
| Control example 1 | 100 km/h: 50 min. to fail |
| Control example 2 | 130 km/h: 110 min. to fail |

Tires were driven on a drum type running tester according to the stepped speed running method on conditions that:

Load: 3.780 kg

Initial internal pressure: 7.25 kgf/cm$^2$

Rim: 7.50 v wherein results were evaluated by the level of speed at which the tire failed due to heat generation and the length of time for running at the above speed. A tire of Example 1 according to the present invention cleared a speed of 130 kg/h, but the tire of control Example 1 which attached much importance to the resistance to wear, could clear only 100 km/h, a tire of control Example 2 which sacrificed the resistance to wear, cleared a speed of 130 km/h because of lower heat generation due to reduced pattern circumferential stiffness. A tire according to the present invention designed to be provided with "Cut grooves" on the shoulder zones for reducing pattern circumferential stiffness, controlled heat generation of durability.

(Resistance to wear)

As regards resistance of the tread to wear, comparison tests using the actual truck were performed and the amounts of wear of tread rubber per 1,000 km running were compared by measurements of remaining groove depth after 50,000 km running. As shown in Table 6, a tire (Example 1) according to the present invention demonstrated an excellent resistance to wear by the contribution of heat generation to a low degree as above described, more uniform distribution of grounding contact pressure, and high gripping performance.

TABLE 6

|  | Index of wear of tread rubber |
|---|---|
| Control Example 1 | 100 |
| Control Example 2 | 80 |
| Example 1 | 105 |

*note: The larger the index number, the better the resistance to wear. The above index number may be regarded as a ratio between wear life span of treads.

(Wet grip performance)

Values obtained from comparison of wet grip performances are shown in Table 7.

TABLE 7

|  | wet grip performance | | |
|---|---|---|---|
|  | control example 1 | control example 2 | Example 1 |
| Index of wet grip | 100 | 110 | 115 |

Wet grip performances were observed by confirming braking distances travelled by the truck driven at a speed of 80 km/h on an asphalt-paved wet road, and indicated in termns of index on the assumption that the index of braking distance of control Example 1 is 100. In this case, too, the larger the index number, the better the performance, and a tire (Example 1) according to the present invention which exhibited a strong breaking force is verified to be excellent in wet grip performance as one of important requirements for safety of a truck.

(Effect of the Invention)

As has been described, the invention provides a well balanced tire in which a plurality of narrow cut are disposed on both shoulder parts, where the heat generation is most remarkable in a tire, to control the heat generation by decreasing the pattern stiffness so that the high speed durability is improved in spite of the extra heavy tread with deepest longitudinal main grooves, and wear life of tread, wandering performance including wet grip performance, ride feeling and handling stability can simultaneously and effectively improved in well-balanced manner.

What is claimed is:

1. A pneumatic radial tire comprising a tread provided with at least two longitudinal main grooves extending circumferentially in a substantially zigzag or wavy line to divide the tread width into two tread shoulder parts and a tread crown part therebetween, said crown part having a width of about 30 to 65% of the tread width;

each tread shoulder part having a plurality of generally axially extending narrow grooves to form circumferentially substantially separated blocks;

the width of the narrow grooves being in a range of 0.5 to 5 mm and said narrow grooves having a volume index in a range of 2.5 to 15;

each shoulder part having a circumferential stiffness index in a range of 30 to 70;

wherein the circumferential stiffness index in the shoulder part and the volume index of the narrow grooves are defined as follows:

the Volume Index = $V/(S \times d) \times 100$ wherein:

V = total volume of the cut grooves in the shoulder part
S = surface area of the shoulder part
d = depth of the longitudinal main groove the Circumferential Stiffness Index = $(Kpt/Kpo) \times 100$ wherein:

Kpt = circumferential stiffness in the shoulder part after the narrow grooves are provided
Kpo = circumferential stiffness in the shoulder part before the narrow grooves are provided Circumferential Stiffness = $F/y$ wherein:

F = tangential force in the circumferential direction of the tire at the ground contacting surface of the shoulder part y = variation of the ground contacting surface in the circumferential direction of the tire.

2. A pneumatic radial tire as claimed in claim 1 wherein the tread crown part is provided with a plurality of rows of blocks.

3. A pneumatic radial tire as claimed in claim 1 wherein the tread crown part is provided with at least one rib.

4. A pneumatic radial tire as claimed in claim 1 wherein the narrow grooves are shallower than the longitudinal main grooves.

5. A pneumatic radial tire as claimed in claim 1 wherein the narrow grooves are inclined at an angle to the axial direction of the tire.

* * * * *

UNITED STATES PATENT AND TRADEMARK OFFICE
CERTIFICATE OF CORRECTION

PATENT NO. : 4,784,200
DATED : November 15, 1988
INVENTOR(S) : Kenichi FUJIWARA

It is certified that error appears in the above-identified patent and that said Letters Patent is hereby corrected as shown below:

The first page (title page) should read:

--[30]   Foreign Application Priority Data
   March 30, 1985 [JP]   Japan .............67297--

Signed and Sealed this

Twenty-seventh Day of February, 1990

*Attest:*

JEFFREY M. SAMUELS

*Attesting Officer*   *Acting Commissioner of Patents and Trademarks*